March 16, 1954  C. S. BOWER  2,672,268
THERMOPLASTIC SEALING OF BAGS WITH VACUUM NOZZLES
Filed Feb. 25, 1948  5 Sheets-Sheet 1
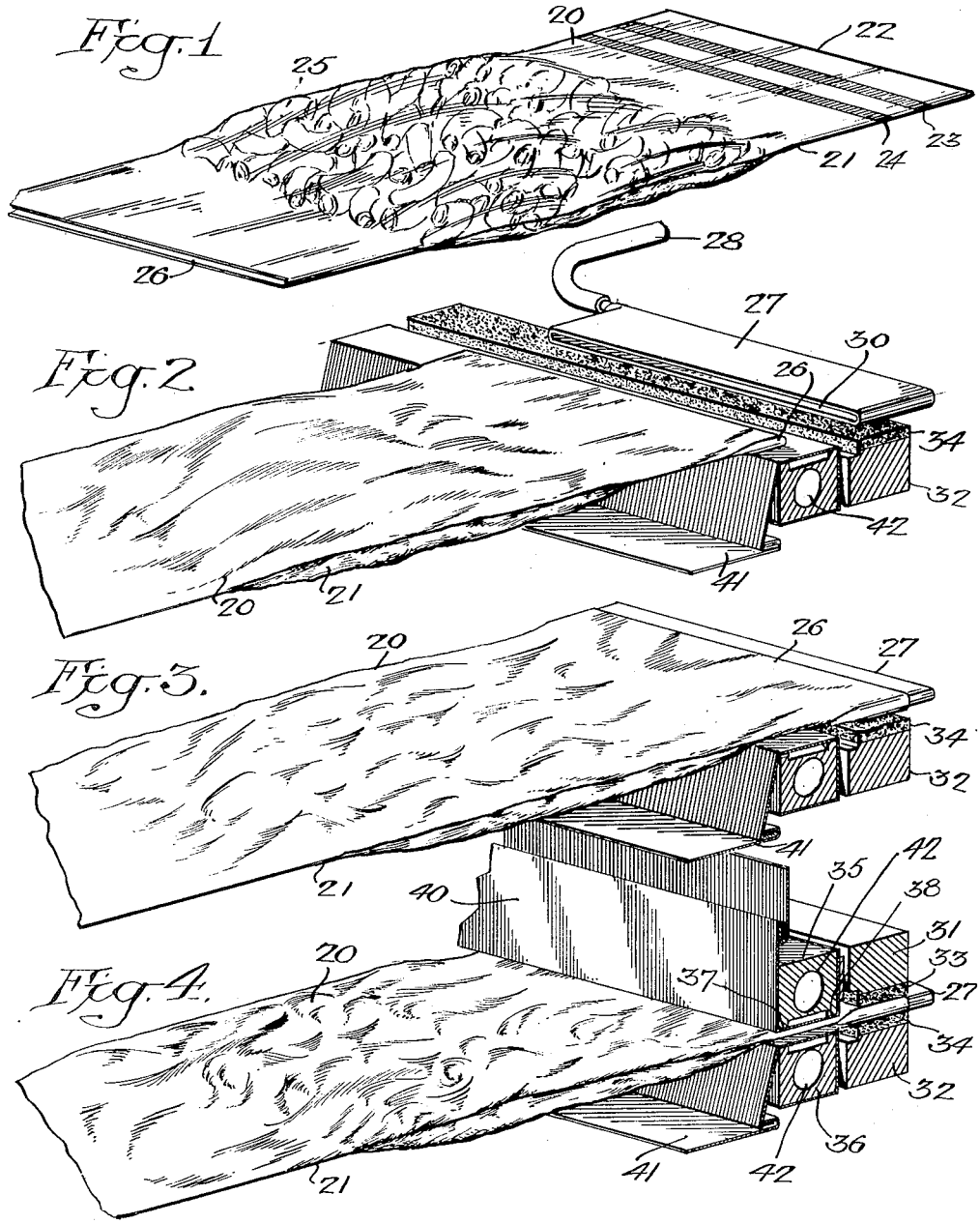
INVENTOR
Clyde Bower
BY
ATTORNEYS

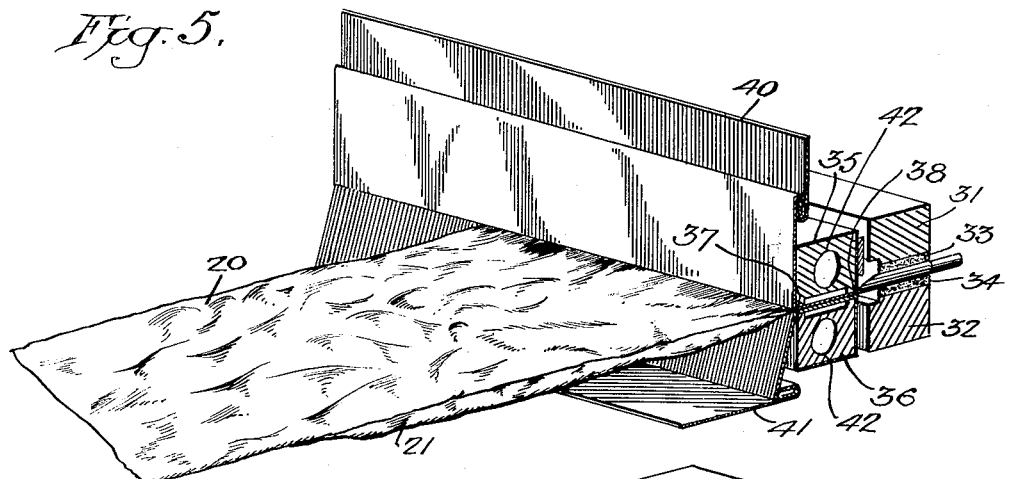
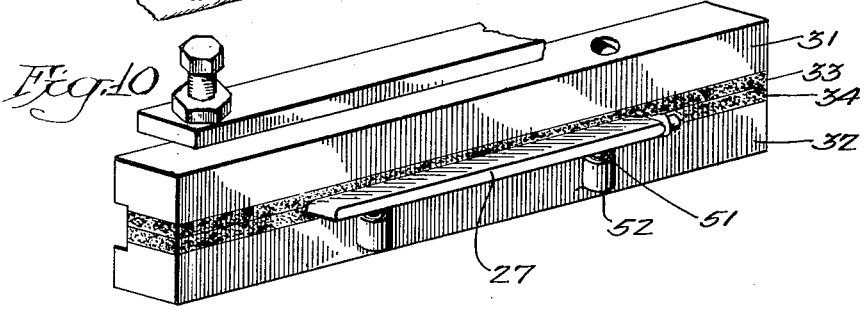
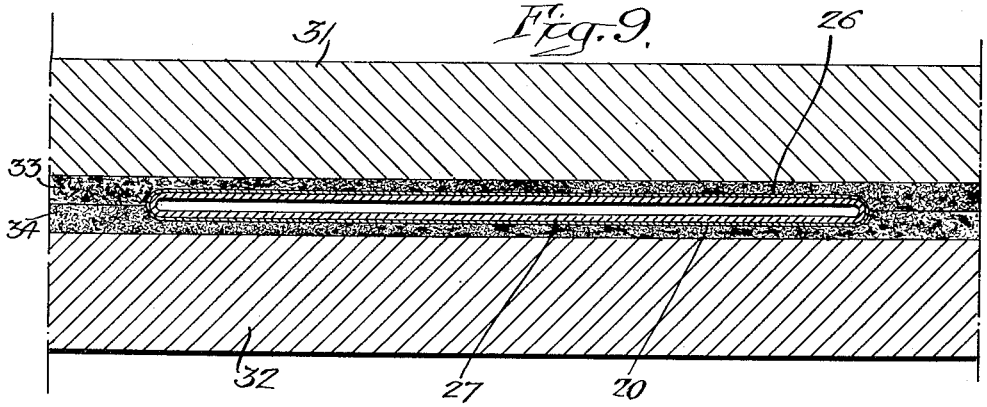

March 16, 1954 C. S. BOWER 2,672,268
THERMOPLASTIC SEALING OF BAGS WITH VACUUM NOZZLES
Filed Feb. 25, 1948 5 Sheets-Sheet 3

INVENTOR
Clyde Bower
BY
ATTORNEYS.

March 16, 1954   C. S. BOWER   2,672,268
THERMOPLASTIC SEALING OF BAGS WITH VACUUM NOZZLES
Filed Feb. 25, 1948   5 Sheets-Sheet 4
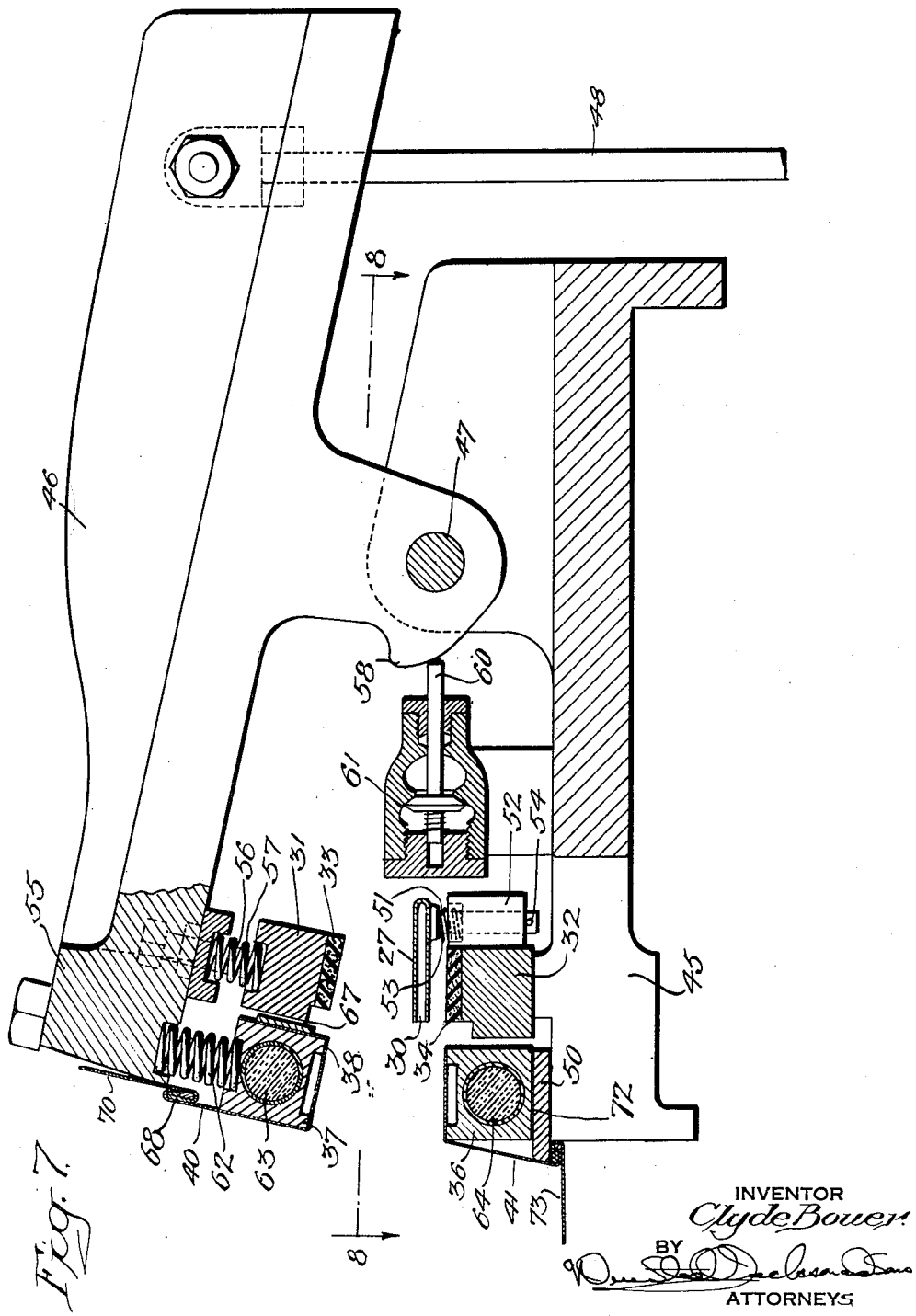
INVENTOR
*Clyde Bower*
BY
ATTORNEYS

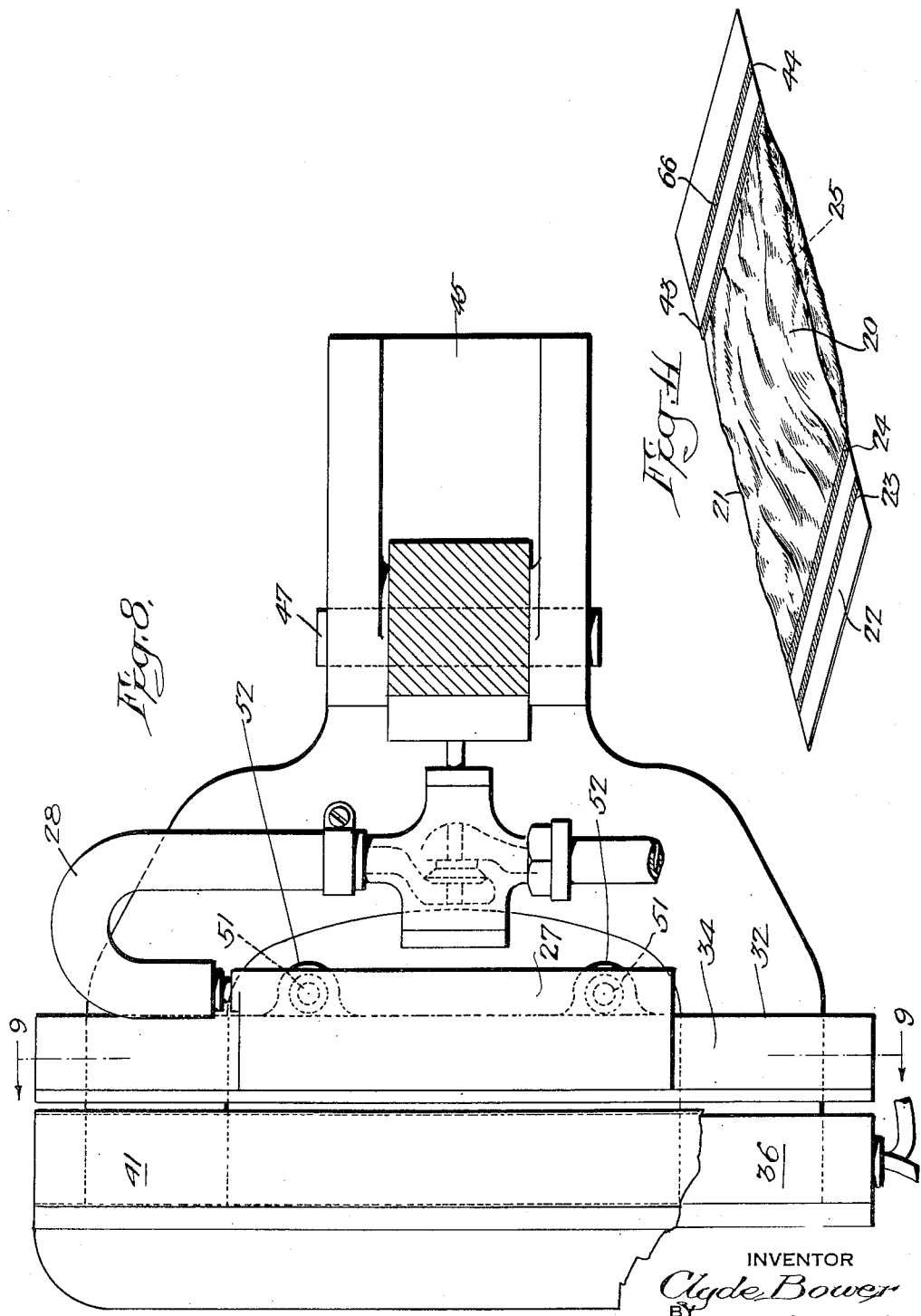

Patented Mar. 16, 1954

2,672,268

UNITED STATES PATENT OFFICE 2,672,268

THERMOPLASTIC SEALING OF BAGS WITH VACUUM NOZZLES

Clyde S. Bower, Primos, Pa., assignor of one-half to William R. McLain, Philadelphia, Pa.

Application February 25, 1948, Serial No. 10,731

3 Claims. (Cl. 226—56)

The present invention relates to the forming of thermoplastics, particularly to the sealing thereof.

A purpose of the invention is to permit the forming of thermoplastics which have a tendency to adhere to a mold or other forming surface by employing a plastic parting sheet or layer on the forming surface or surfaces which prevents such adherence.

A further purpose is to heat thermoplastic plastic for forming and preferably also to apply forming pressure, such as sealing pressure, through a plastic parting layer.

A further purpose is to employ a heat resisting polymerized unsaturated fluorine-substituted hydrocarbon, preferably consisting of carbon and fluorine, as a parting layer for a thermoplastic, especially polyethylene or polythene.

A further purpose is to extend the mouth of a thermoplastic plastic bag such as a polyethylene or polythene bag around a vacuum nozzle, to grip the mouth of the bag around the nozzle, and to pinch or press opposite walls of the bag at a zone located toward the opposite end of the bag from the mouth, between parting plastic layers while heating through the layers and sealing by the pressure.

A further purpose is to apply pressure on polyethylene or polythene for forming or sealing purposes at elevated temperatures by means of tetrafluoroethylene.

A further purpose is to provide two sets of jaws, one of which grips the mouth of a bag for evacuation and the other of which seals, on a support, with one gripping jaw and one sealing jaw positioned resiliently on the support and the gripping jaw in advance of the sealing jaw as the jaws close, so that further closure will accomplish sealing after gripping has already been accomplished.

A further purpose is to provide for vacuum connection to the gripping jaws in response to closure motion of the supports.

Further purposes appear in the specification and in the claims.

In the drawings I have chosen to illustrate a few only of the embodiments in which my invention may appear, choosing the forms shown from the standpoints of convenience in illustration, satisfactory operation and clear demonstration of the principles involved.

Figures 1 to 5 inclusive are diagrammatic fragmentary perspectives illustrating the steps of evacuating and sealing a bag in accordance with the invention.

Figure 7 is a sectional side elevation of Figure 6.

Figure 8 is a fragmentary sectional plan of Figure 7 on the line 8—8.

Figure 9 is a fragmentary section of Figure 8 on the line 9—9.

Figure 10 is a fragmentary rear perspective of the suction gripping jaws and suction nozzle.

Figure 11 is a perspective of a completed vacuum-sealed bag in accordance with the invention.

Figure 6:
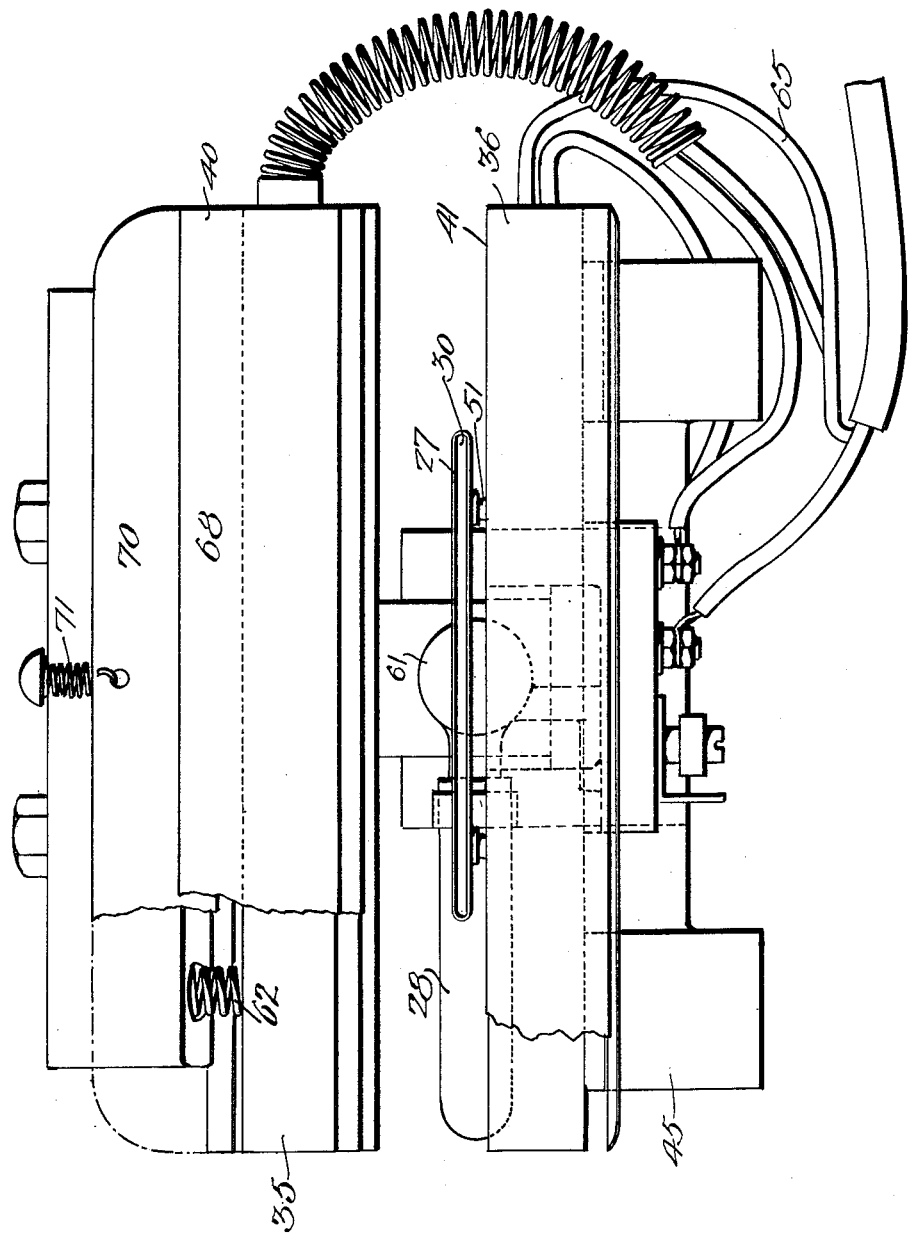
Figure 6 is a front elevation, partly broken away, of mechanism for accomplishing the evacuation and sealing.

Describing in illustration but not in limitation and referring to the drawings:

Many commodities, especially foods and medicines, can be kept very well if maintained under vacuum storage conditions during the period from packing by the manufacturer to use by the user, and numerous efforts have been made to produce satisfactory vacuum packages. Many of the prior art processes have been cumbersome and expensive, or of limited utility, particularly because the packing materials used to provide a vacuum-tight layer have been relatively ineffective.

Very superior vacuum seals can be accomplished by sheets or layers of polyethylene or polythene which are quite impervious to air leakage, but considerable difficulty has been encountered in the handling and particularly the forming and sealing of these materials.

Whereas many thermoplastic plastics can be sealed and formed with reasonable success by pressure applied by metal surfaces, polyethylene and polythene are not efficiently handled in this way because of the tendency to adhere to and build up on the die. In the case of polyethylene it is sometimes possible to operate for quite a number of cycles without any adherence or build-up, and then a build-up of a layer of adhering plastic material on the die will gradually become evident. Suddenly adherence between the die and the thermoplastic material will occur and further operation becomes impossible without the delay incident to removal and cleaning of the dies.

I have discovered that forming pressure for the purpose of sealing or other forming can be applied at thermoplastic temperature to polyethylene, polythene and other thermoplastic materials without danger of adherence or build-up provided a heat resistant plastic parting sheet or layer is used on the forming surfaces, suitably the dies.

For most advantageous use, the parting plastic layer should be heat resistant polymerized unsaturated fluorine-substituted hydrocarbon such as tetrafluoroethylene, hexafluoropropylene, octafluorobutylene, or their homologues or equivalents. The parting plastic will very desirably be the completely fluorine-substituted hydrocarbon (that is, all hydrogen atoms will be substituted in the preferred form) so that the parting plastic will consist of carbon and fluorine. Polymerized tetrafluoroethylene is a comparatively firm resilient plastic available in sheet form, having a service temperature as high as 500° to 550° F. It shows the remarkable property of being completely inert to the adhesiveness of thermoplastic plastics such as polyethylene and polythene, and of having adequate heat conductivity so that heat for forming or sealing can be conducted through such parting plastic layer.

Reference is made herein to forming and it will be understood that the sealing shown specifically herein is only one illustration of shaping or forming of such thermoplastics as polythene and polyethylene using the fluorine-substituted hydrocarbon plastic as a parting layer.

Figure 1 illustrates a bag 20 having side edges 21 which are suitably closed by making the bag from tubular stock, avoiding the necessity of a longitudinal seam in the preferred form. The bottom end 22 is sealed in any suitable manner, conveniently by heat sealing at 23 and 24 across the seam, as shown in Figure 11. The bag is then filled with suitable contents 25 to be packaged which may be any one of a wide variety of products, Figure 1 showing macaroni and Figure 11 indicating coffee. Other examples are vegetables of any convenient type, baked goods such as cookies and crackers, candy, pharmaceuticals such as dry penicillin, chemicals, and in general any product which can to advantage be vacuum packed.

The bag has an initially open mouth 26 which is directed toward the observer in Figure 1 but in Figures 2 to 5 is reversed.

The bag material is suitably a thermoplastic plastic sheet material such as polyethylene or polythene, though any other equivalent material might be used, whether now known or later developed.

The mouth of the bag is fitted over an elongated vacuum nozzle 27 as shown in Figures 2 and 3, the nozzle being connected to a source of vacuum by a suitably flexible connection 28, and having an elongated vacuum passage 30 at its forward end directed into the bag. On opposite sides of the nozzle (above and below in the preferred form) are vacuum gripping dies 31 and 32 (Figures 4 and 5) extending in length greater than the nozzle and the mouth of the bag, and having on their mating faces cushioning material 33 and 34 of any suitable resilient substance such as cellular rubber. Thus as well shown in Figure 4, the mouth of the bag is firmly held against the nozzle by the dies acting through the cellular rubber cushions above and below and also acting at the ends of the mouth of the bag due to the resilience of the cushioning, since the dies are longer than the nozzle.

When held in this position, the bag can be thoroughly evacuated, causing the sides of the bag to grip the contents very firmly and producing a comparatively rigid package which has great protective value in preventing disintegration of the contents during shipment and sale.

Located on either side of the bag close to the mouth but toward the opposite end of the bag from the mouth are sealing dies 35 and 36 respectively above and below and each having co-operating sealing surfaces 37 and 38 extending transversely and spaced longitudinally of the bag. Covering the operating surfaces of the sealing dies are layers 40 and 41 of parting plastic sheet which extend entirely over the cooperating surfaces 37 and 38 of each die and actually contact the thermoplastic plastic to be sealed, protecting the suitably metallic die surfaces from adhesion to the plastic of the bag. The parting layers are preferably of heat resisting polymerized unsaturated fluorine-substituted hydrocarbon as already explained. The sealing dies are conveniently heated by passing heaters, suitably electric heaters, through heater openings 42 longitudinally of the dies. Thus it will be seen that the pressure of the dies against the parting layers causes heat from the dies to flow through the parting layers to the opposite sheets of the envelope or bag, and the combination of heat and pressure forms the thermoplastic plastic, preferably sealing the same along two seal lines 43 and 44 (Figure 11).

The sealing dies and the gripping dies can then be opened and the bag withdrawn. The mouth portion can be left on the bag as shown in Figure 11 or can be trimmed off as desired.

Mechanism is shown in Figures 6 to 10 for carrying out the operations illustrated diagrammatically in Figures 1 to 5 inclusive. The machine has a base 45 and a head 46 pivotally connected together at 47, so as to provide for separation. The head is manipulated by a pull rod 48, which may be operated in any suitable way, as by foot pedal or crank, not shown.

On the base 45 suitably rigidly positioned are the lower suction gripping die 32 and the lower heat sealing die 36 positioned one beside the other as best seen in Figure 7. The die 36 may be conveniently supported as on a mounting strip 50 fastened thereto and resting on the base.

The nozzle 27 is preferably resiliently mounted as on vertically movable guide pins 51 in lugs 52 on the gripping jaw 32, spring urged at 53 into upward position and limited in motion by pins 54. Thus when the gripping jaws are separated the nozzle will automatically spring to a position away from the lower gripping jaw to aid in insertion or removal of the lowermost side of the mouth, while when the gripping jaws close the nozzle will move downward against the lowermost gripping jaw into the position best seen in Figures 9 and 10.

The upper cooperating die and gripping jaw on the head 46 are mounted on an outer support 55, with the upper suction gripping jaw 31 mounted on pins 56 movable in the support and urged by springs 57 away from the support so that as the movable support closes on the base support the upper gripping die first engages the upper wall of the mouth of the bag, pushes the nozzle down until the nozzle begins to seat on the cushion of the lower gripping jaw, and then begins to move relatively to the movable support by movement of the pins 56 against the springs 57.

As the movable support 55 lowers, a cam 58 on the head presses the operating stem 60 of a vacuum valve 61, spring biased to close, and connected to the flexible hose 28 on the nozzle, opening the valve to apply suction at a point corresponding to the closure of the gripping jaws and gripping of the mouth of the bag.

When the bag is thoroughly gripped on the nozzle as in Figures 9 and 10, the positioning of the spacing of the sealing dies is sufficiently behind the position of the gripping jaws so that as shown in Figure 4 the sealing dies do not yet press against the thermoplastic plastic and therefore no sealing occurs. Slight additional closing motion, however, causes the sealing dies to close, under compression of springs 62 which support the upper sealing die 35 from the support. Under these conditions the spaced sealing surfaces press through the parting plastic layers and heat from the sealing dies applied by suitable heaters such as electric resistors 63 and 64 actuated by suitable electric wiring 65 causes the bag material to become thermoplastic and to form a seal under the pressure. The forming may for example involve a ridge effect 66 across the seal as shown in Figure 11.

Any convenient method may be used to position the parting sheets. In the preferred embodiment one end of the upper plastic parting sheet is anchored at 67 to one side of the upper sealing die, and the opposite end is engaged at 68 to a tension strip 70 which is spring urged at 71 to maintain the parting sheet taut across the sealing die surfaces. The plastic parting sheet on the lower sealing die is conveniently fastened at one end 72 between the mounting strip 50 and the lower die, and the other end is engaged to a weight 73 and allowed to hang freely to maintain the parting sheet taut.

It will be evident that any other convenient means may be used to maintain the parting sheet smooth on the surfaces of the dies.

It will be evident that the invention can be applied to other sealing arrangements, making either a single seal or a plurality of seals in any desired form or configuration. Of course, the material may be trimmed to any extent and if desired one or more of a plurality of seals may be trimmed off for neatness leaving only a single seal or group of seals.

In operation, the bag will be filled with its contents and applied to the vacuum nozzle while the gripping jaws and the sealing dies are separated. The gripping jaws will then be brought together upon the mouth of the bag on the nozzle, and the vacuum suitably applied, as for example automatically. The bag will thus be evacuated and will be ready for sealing.

The sealing die equipped with the parting layer of tetrafluoroethylene or the like, and heated to a proper temperature to render the polyethylene or polythene thermoplastic, will then be brought together firmly engaging the layers of polyethylene or polythene behind the mouth to seal. The heated contact with the parting sheet will cause heating of the thermoplastic bag and sealing of its layers, retaining the vacuum condition created inside the bag.

The sealing die and the gripping jaws will then be separated and the mouth of the bag will be removed from the nozzle permitting the bag to assume the completed form as shown in Figure 11.

I find that the device of the invention can be operated indefinitely without interruption or destruction of bags due to adhesion with the sealing die, and therefore it is possible to obtain unusually satisfactory results in respect to sealing without substantial rejections, without marring the appearance of the sealed product by partial adhesion and without delay incident to cleaning the sealing dies.

In view of my invention and disclosure variations and modifications to meet individual whim or particular need will doubtless become evident to others skilled in the art, to obtain all or part of the benefits of my invention without copying the structure and process shown, and I, therefore, claim all such insofar as they fall within the reasonable spirit and scope of my claims.

Having thus described my invention what I claim as new and desire to secure by Letters Patent is:

1. In a heat sealing machine, a pair of cooperating supports movable toward and away from one another, a pair of cooperating vacuum gripping jaws one on each support and one resiliently movable with respect to its support, a vacuum nozzle interposed between the vacuum gripping jaws, cooperating heat sealing jaws one on each support and one resiliently positioned with respect to its support, the vacuum gripping jaws being positioned relatively in advance of the heat sealing jaws so that with movement of the supports toward one another the vacuum gripping jaws will first engage and further movement of the supports will automatically engage the heat sealing jaws with the work, and heaters for the heat sealing jaws.

2. In a heat sealing machine, a pair of cooperating supports movable toward and away from one another, a pair of cooperating vacuum gripping jaws one on each support and one resiliently movable with respect to its support, a vacuum nozzle interposed between the vacuum gripping jaws resiliently mounted from one of the supports and biased away from the vacuum gripping jaw on that support so as to have relative movement toward one of the vacuum gripping jaws when the vacuum gripping jaws come together and away therefrom when the jaws separate, cooperating heat sealing jaws one on each support and one resiliently positioned with respect to its support, the vacuum gripping jaws being positioned relatively in advance of the heat sealing jaws so that with movement of the supports toward one another the vacuum gripping jaws will first engage and further relative movement of the supports will automatically engage the heat sealing jaws with the work, and heaters for the heat sealing jaws.

3. In a heat sealing machine, a pair of cooperating supports movable toward and away from one another, a pair of cooperating vacuum gripping jaws one on each support and one resiliently movable with respect to its support, a vacuum nozzle interposed between the vacuum gripping jaws resiliently mounted from one of the supports so as to have relative movement toward one of the vacuum gripping jaws when the vacuum gripping jaws come together, cooperating heat sealing jaws one on each support and one resiliently positioned with respect to its support, the vacuum gripping jaws being positioned relatively in advance of the heat sealing jaws so that with movement of the supports toward one another the vacuum gripping jaws will first engage and further relative movement of the supports will automatically engage the heat sealing jaws with the work, heaters for the heat sealing jaws, and a vacuum valve operatively connected to the nozzle and to one of the supports for applying vacuum automatically when the supports move together.

CLYDE S. BOWER.

References Cited in the file of this patent

UNITED STATES PATENTS

| Number | Name | Date |
|---|---|---|
| 2,145,941 | Maxfield | Feb. 7, 1939 |
| 2,213,744 | Robertson | Sept. 3, 1940 |
| 2,281,187 | Waters | Apr. 28, 1942 |
| 2,289,618 | Young | July 14, 1942 |
| 2,305,010 | Kenney | Dec. 15, 1942 |
| 2,362,462 | Belcher | Nov. 14, 1944 |
| 2,390,550 | Moore | Dec. 11, 1945 |
| 2,395,387 | Fry | Feb. 26, 1946 |
| 2,405,675 | Southwick | Aug. 13, 1946 |
| 2,410,834 | Messmer | Nov. 12, 1946 |
| 2,421,373 | Cozza | June 3, 1947 |
| 2,424,558 | Delano | July 29, 1947 |
| 2,460,460 | Langer | Feb. 1, 1949 |